United States Patent [19]

Bessey

[11] Patent Number: 4,765,151

[45] Date of Patent: Aug. 23, 1988

[54] FOOD AND DRINK COOLER FOR AUTOMOBILES

[76] Inventor: Alan L. Bessey, 406 Main St., N., Dunlap, Tenn. 37327

[21] Appl. No.: 123,600

[22] Filed: Nov. 20, 1987

[51] Int. Cl.⁴ .............................................. B60H 1/32
[52] U.S. Cl. ...................................... 62/239; 62/243; 62/244
[58] Field of Search ........................ 62/239, 244, 243

[56] References Cited

U.S. PATENT DOCUMENTS

| | | | |
|---|---|---|---|
| 2,070,379 | 2/1937 | Stramaglia | 62/244 X |
| 2,344,864 | 3/1944 | Griswold | 62/239 X |
| 2,358,071 | 9/1944 | Hurtado | 62/244 X |
| 2,561,876 | 7/1951 | Leonard | 62/243 |
| 2,779,164 | 1/1957 | Doane | 62/243 X |
| 3,498,076 | 3/1970 | Michael | 62/244 |
| 3,858,405 | 1/1975 | Manzke | 62/243 X |
| 4,103,510 | 8/1978 | Hall | 62/243 X |

Primary Examiner—Lloyd L. King
Attorney, Agent, or Firm—Alan Ruderman

[57] ABSTRACT

A food and drink cooler is provided for automobiles having a "ski hole" in a partition between the trunk and the passenger compartment. The cooler is mounted in the vehicle trunk and has a top closure lid and closeable portal in an upstanding wall. The portal includes a hub extending from the wall and positionable through the "ski hole" so that a passenger in the vehicle may have access to the interior of the cooler. A closure member closes the portal when not in use. The cooler includes a false floor which has drain holes for permitting melted ice to drain down onto the base of the cooler, and the water so melted may flow through a drain plug at the bottom of the cooler to tubing connecting the plug to the exterior of the vehicle. The cooler also includes a water and ice dam which precludes water and ice from flowing out through the portal when the closure member is removed and the vehicle is in motion.

10 Claims, 1 Drawing Sheet

FOOD AND DRINK COOLER FOR AUTOMOBILES

BACKGROUND OF THE INVENTION

This invention relates to an ice chest type cooler for motor vehicles and more particularly to a food and drink cooler adapted for storage within the trunk of an automobile while having the interior thereof accesssible from within the passenger compartment of the vehicle.

Conventional food and drink coolers adapted for use when picnicking or the like, unless of a small size such as not to be convenient for use by a number of people such as a family, when taken to the picnic area by automobile must be stored within the trunk of the automobile and are not accessible to the passengers unless the automobile is stopped and the cooler is retrieved from the trunk. Such coolers may also be used when the family is on a trip; and where children are passengers, the stopping of the automobile to retrieve food and drink can be a repetitious inconvenience.

In conventional ice chest type coolers the chest comprises a storage compartment for the food, drink and ice. Entrance to the interior of the chest is through a closure member at the top which is removable for placing therein and removal therefrom of the food, drink and ice. The great advantage of these coolers is their portablity and economics both in initial cost and in use. However, as aforesaid when used in conjunction with an automobile trip, they must be stored in the trunk.

In view of such inconveniences of the prior art coolers having sufficient size to accommodate the needs of a family or the like when traveling in an automobile, the prior art has proposed food and drink coolers which are built into the automobile. For example, in Saterlie U.S. Pat. No. 2,525,952 an automobile refreshment bar is fixedly mounted in the trunk of the automobile and accessible to the passenger compartment through a pivotably moving portion of the rear seat. In this proposal the food and drink storage portion is fixedly mounted within the trunk, although an ice container is removeably attached to the bottom thereof. This provides a number of disadvantages, not the least of which is that the food and drink must be placed within the storage portion from within the vehicle rather than being filled at home, and that the cooling portion is separate from the storage portion so that the cooling is inefficient. In Gaus U.S. Pat. No. 4,545,211 a refrigeration unit is built into a pedestal of a vehicle between two seats. This however, not only reduces the available space for passengers within the vehicle and provides a clear inconvenience considering the small size of most contemporary automobiles, but additionally the unit requires power for running a motor, compressor and fan and this power must be taken from the vehicle power supply.

It is known that in at least the Volvo automobile a rectangular opening is provided in a partition between the trunk and the passenger compartment, this opening being known as a "ski hole" and is provided so that skies may be stored within the trunk and, rather than projecting outwardly beyond the rear of the vehicle, extend forwardly into the passenger compartment. The opening, which is approximately five inches by seven inches, accommodates a cross sectional configuration conforming to one or two pairs of skies. Such holes have no other known function.

SUMMARY OF THE INVENTION

Consequently, it is primary object of the present invention to provide an ice chest cooler for automobiles, the cooler being mounted in the storage trunk of the automobile and having the interior thereof accessible from the passenger compartment of the automobile.

It is another object of the present invention to provide a portable food and drink cooler for use in an automobile having an opening between the trunk and the passenger compartment, the cooler having a top closure lid for inserting and storing food, drink and ice, and having a closeable portal in a wall thereof, the portal communicating with the interior of the cooler, and the cooler being mounted within the vehicle trunk and accessible to passengers within the interior of the vehicle through the opening therebetween.

It is a further object of the present invention to provide a food and drink cooler for automobiles, the cooler being mounted within the trunk of the automobile and having its interior accessible through a portal in a wall thereof from within the passenger compartment through a hole therebetween, the cooler having a false floor for permitting melted ice water to flow down from the food, drink and ice compartment and out a drain to the exterior of the vehicle, and having a water and ice dam to preclude ice and water from flowing into the passenger compartment while the vehicle is in motion and the portal is open.

Accordingly, the present invention provides a cooler for automobiles having a "ski hole" or the like, the cooler being mounted in the vehicle storage trunk behind the rear seat. The cooler comprises a container having a top closure member and a closeable portal in a side wall, the portal being disposed for entry through the "ski hole" so that a passenger in the vehicle may have access into the interior of the cooler through the "ski hole" and the portal merely by removing the closure member. The cooler is portable and the top closure permits filling and emptying of the cooler while removed from the vehicle. Another aspect of the invention provides a perforated false floor in the cooler so that ice that has melted may flow downwardly out of the cooler storage section and into a sub level which communicates through a drain to tubing directing the water out the vehicle beneath the trunk. A further aspect of the invention is the provision of a water and ice dam disposed so as to preclude ice and/or water from flowing out through the portal when the closure member has been removed for access into the interior of the cooler while the vehicle is in motion.

The cooler has been specifically constructed for use with Volvo automobiles, but may be utilized with any vehicle merely by modifying the partition between the trunk and rear passenger compartments by putting a hole therein.

BRIEF DESCRIPTION OF THE DRAWINGS

The particular features and advantages of the invention as well as other objects will become apparent from the following description taken in connection with the accompanying drawings, in which.

DESCRIPTION OF THE PREFERRED EMBODIMENT

Figure 1:
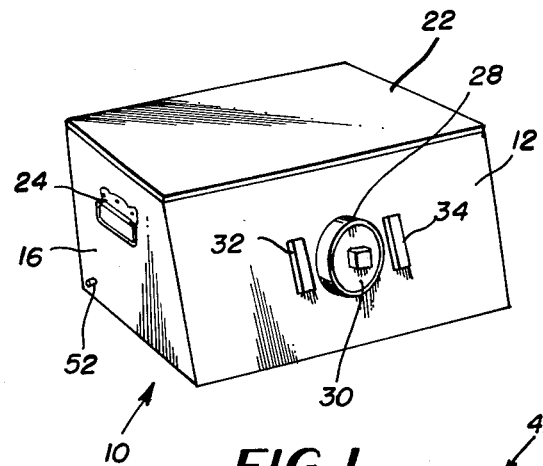
FIG. 1 is a front perspective view of an automobile food and drink ice cooler constructed in accordance with the principles of the present invention.
Figure 2:
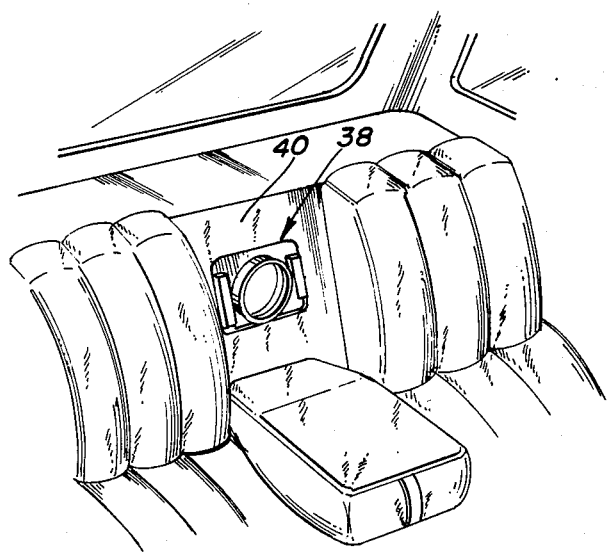
FIG. 2 is a fragmentary perspective view of the rear seat of a vehicle having the cooler of FIG. 1 mounted in the trunk thereof and illustrating an arm rest folded down to depict the entry portal of the cooler extending therethrough, the portal closure being removed.
Figure 3:
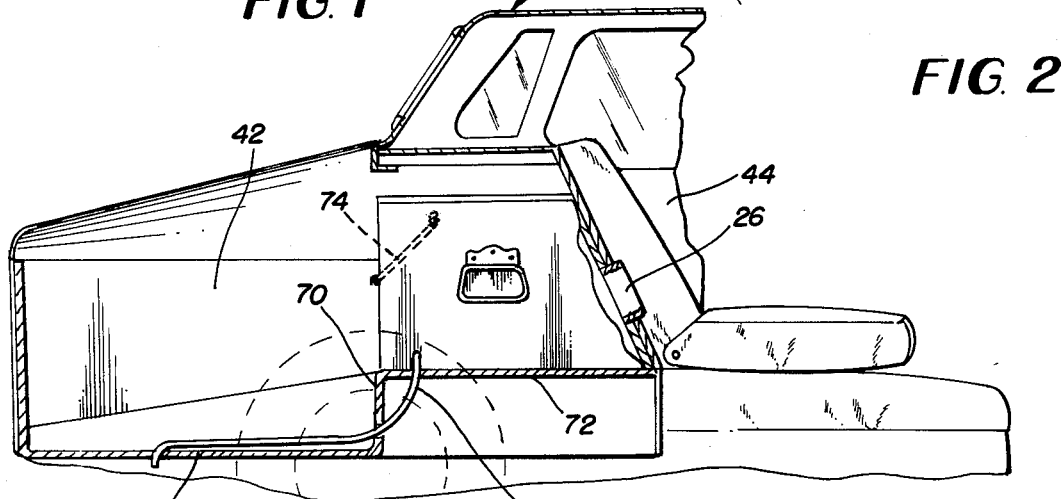
FIG. 3 is a vertical cross sectional view of a portion of the vehicle of FIG. 2 illustrating the disposition of the cooler in the trunk behind the rear passenger section.
Figure 5:
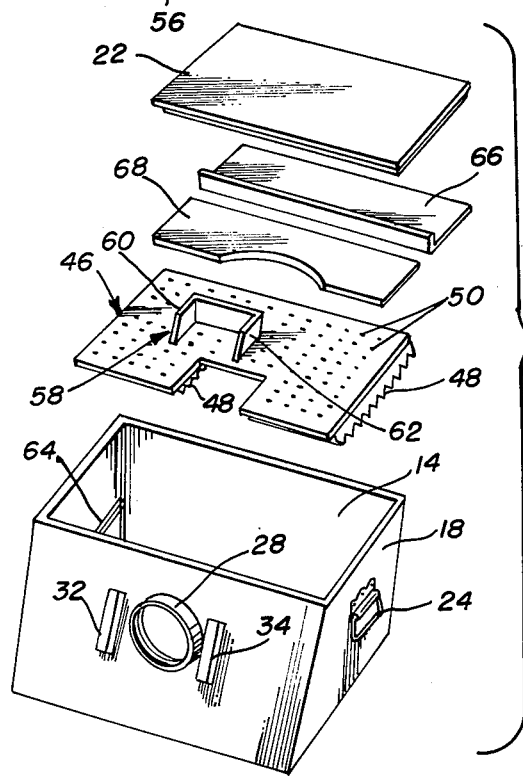
FIG. 5 is a disassembled perspective view of the cooler of FIG. 1 with the portal closure removed.
Figure 4:
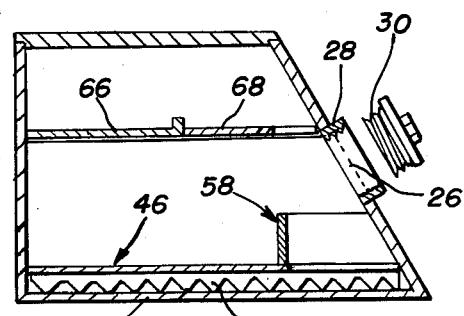
FIG. 4 is a vertical cross sectional view through the cooler of FIG. 1.
Figure 6:
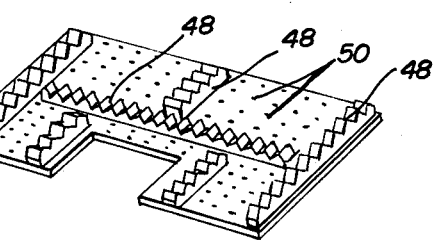
FIG. 6 is an inverted perspective view of the false floor of the cooler.

Referring now to the drawings, a food and drink cooler 10 adapted for mounting in the trunk of a car while having the interior thereof accessible from the passenger compartment. The cooler comprises a receptacle including front and rear walls 12, 14 respectively interconnected together by end walls 16, 18 and a base 20, and being enclosed at the top by a cover or lid 22 which may be tightly secured thereto in conventional manner and which, if desired, may be hingedly attached to the top of one of the walls. Carrying handles 24 may be fastened to the ends 16, 18 to aid in carrying the cooler to and from the car.

The front wall 12 includes an opening 26 which together with a hollow cylindrical hub 28 fastened within the wall defines an access portal which is closeable in sealed relationship by a closure member 30. The closure member 30 may be threadily attached within the hub, as illustrated, or may be removeably attached thereto in any other conventional manner such as a friction fit push-pull member. Disposed on the front 12 adjacent to and on either lateral end of the hub 28 is a respective anti-slide bar 32, 34, the spacing between the ends of the bars 32, 34 being substantially equal to or slightly less than the lateral dimension of the hole 38 formed in a partition wall 40 of a vehicle 41 between the storage trunk 42 and the passenger compartment 44, as for example, the lateral dimension of the "ski hole" of a Volvo automobile. The hub 28 projects beyond the face 12 of the cooler so as to be disposed conveniently through the hole 38 and the bars 32, 34 also extend through the hole 38 to abut the lateral edges to ensure that the cooler does not slide laterally since the opening 26 is circular while the hole 38 is rectangular. The opening 26 is of a sufficient size for receiving the hand of a person, such size being approximately five inches in diameter.

Disposed on the base 20 within the cooler 10 is a false floor 46 having wave shaped baffles 48 extending from its lower surface both lengthwise and sidewise. The baffles are positionable on the interior surface of the base of the cooler and are spaced apart along the lower surface of the floor so as to raise the upper surface of the floor 46 above the base surface of the cooler thereby to allow for the accumulation of water melting from ice disposed within the cooler. The wave configuration of the baffles permits the water to flow in the space between the floor and the base. The false floor 46 includes perforations or small drain holes 50 which permit the water readily to flow to the bottom of the cooler. The cooler at a lower portion thereof at or adjacent the bottom includes a drain plug 52 which is adapted to be connected to a flexible tube 54, the tube passing through a floor of the vehicle 41, such as the wheel well or the like so that the water may drain out from the bottom 56 of the automobile.

At the center of the leading edge of the floor 46 at a location just below the opening 26, the floor has a cut-out for receiving a small water and ice dam 58 in the form of a substantially U-shaped member having upstanding walls, the leading edges of its legs 60, 62 being adapted to abut the interior surface of the wall 12 to preclude water and ice which has melted from flowing through the portal into the passenger compartment when the closure 30 has been removed from the opening 26. The height of the walls of the dam 58 are such that they are just below the elevation of the bottom of the opening 26. Although illustrated as a separate member the dam 58 preferably will be formed together with the base 20. Additionally, lips 64 may be formed on the interior walls of the cooler for supporting shelves 66, 68.

It is anticipated that the cooler will be molded from a synthetic plastic material such as polyurethane, the receptacle and the dam being formed as an integral structure. The exterior configuration may be formed so as to match that of the automobile for which it is to be used. As illustrated, the front wall 12 is sloped to conform to that of the partition 40 of the Volvo automobile which also has a step 70 to form a platform 72 at the front portion of the trunk adjacent the partition, and the cooler may be positioned on the platform and held therein by a flexible band 74 or the like.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A food and drink cooler for use in an automobile having a storage trunk, a passenger compartment adjacent the trunk and a partition between the trunk and the passenger compartment, said partition having a hole communicating the trunk with the compartment, said cooler comprising a receptacle having a base, a plurality of upstanding walls and a lid for enclosing the top and for permitting entry into the receptacle when the lid is open, a portal formed in one of the walls, said portal including an opening extending through said wall, a hollow cylindrical hub disposed about said opening and projecting from the exterior surface of said wall for entry through said hole when the cooler is mounted in said trunk, a closure member, means for removeably connecting said closure member to said hub for opening and closing access into said cooler by a person within the passenger compartment, and means for limiting movement of said cooler relative to said hole when said cooler is supported in the trunk.

2. A food and drink cooler as recited in claim 1, including a false floor disposed on the base within said cooler, said floor including a plurality of spaced apart baffle members extending from a lower surface of said floor for disposition on said base for raising the remainder of the floor off the base to provide a space between said lower surface and said base, said floor including a plurality of drain holes for permitting melted ice water to drain through said floor onto said base, and a drain plug located in the bottom of said cooler below the level of said floor communicating with said space for permitting water on the base to drain out said cooler, said drain plug being connected to a drain tube extending from the trunk to the exterior of said automobile.

3. A food and drink cooler as recited in claim 2, including a water and ice dam disposed within said cooler below said opening, said dam having a substantially U-shaped configuration with upstanding walls, the legs of said dam being directed toward the wall containing said opening.

4. A food and drink cooler as recited in claim 2, wherein said baffles have a wave configuration including valleys and peaks, and said peaks abut said base.

5. A food and drink cooler as recited in claim 3, wherein the height of the walls of said dam are disposed at an elevation slightly below said opening.

6. A food and drink cooler as recited in claim 1, wherein said means for limiting movement of said cooler comprises a pair of elongated bars fastened to said exterior surface of said wall, said hub being disposed intermediate said bars, said hole in said partition being substantially rectangular and said bars being spaced apart for receipt through said hole and substantially abutting lateral edges of said hole.

7. A food and drink cooler as recited in claim 6, including a false floor disposed on the base within said cooler, said floor including a plurality of spaced apart baffle members extending from a lower surface of said floor for disposition on said base for raising the remainder of the floor off the base to provide a space between said lower surface and said base, said floor including a plurality of drain holes for permitting melted ice water to drain through said floor onto said base, and a drain plug located in the bottom of said cooler below the level of said floor communicating with said space for permitting water on the base to drain out said cooler, said drain plug being connected to a drain tube extending from the trunk to the exterior of said automobile.

8. A food and drink cooler as recited in claim 7, including a water and ice dam disposed within said cooler below said opening, said dam having a substantially U-shaped configuration with upstanding walls, the legs of said dam being directed toward the wall containing said opening.

9. A food and drink cooler as recited in claim 8, wherein the height of the walls of said dam are disposed at an elevation slightly below said opening.

10. A food and drink cooler as recited in claim 9, wherein said baffles have a wave configuration including valleys and peaks, and said peaks abut said base.

* * * * *